US006228532B1

(12) United States Patent
Tsuji et al.

(10) Patent No.: US 6,228,532 B1
(45) Date of Patent: May 8, 2001

(54) LITHIUM SECONDARY CELL

(75) Inventors: Taishi Tsuji; Takako Miyake; Shuuichi Yanagisawa, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/378,413

(22) Filed: Aug. 20, 1999

(30) Foreign Application Priority Data

Aug. 21, 1998 (JP) .................................................. 10-235474

(51) Int. Cl.⁷ ...................................................... H01M 4/60
(52) U.S. Cl. ................. 429/213; 429/218.1; 429/231.95; 429/245
(58) Field of Search ................................ 429/213, 218.1, 429/231.95, 245

(56) References Cited

U.S. PATENT DOCUMENTS 6,057,056 * 5/2000 Kim et al. ............................. 429/213

* cited by examiner

Primary Examiner—Laura Weiner
(74) Attorney, Agent, or Firm—Perman & Green, LLP

(57) ABSTRACT

There is provided a lithium polymer secondary cell in which reduction of the film thickness of a solid electrolyte can be realized. The lithium ion secondary cell consists essentially of a composite electrode as a positive electrode having a positive electrode layer, containing a mercaptide compound and a conductive material, carried on a collector; the hydrogen atom of at least one mercapto group in the mercaptide compound being substituted with a lithium atom; a polyelectrolyte; and a lithium negative electrode.

5 Claims, 1 Drawing Sheet

LITHIUM SECONDARY CELL

BACKGROUND OF THE INVENTION

1. Field of the Invention

The present invention relates to a secondary cell, particularly to a lithium polymer secondary cell.

2. Description of the Related Art

Recently, lithium secondary cells are drawing attention among other secondary cells, since they have high energy densities and can realize lightening of the cells.

The lithium secondary cell has, for example, a structure which comprises; a positive electrode having a positive electrode layer such as of lithium cobaltate ($LiCoO_2$) formed on a positive electrode collector; and a negative electrode having a negative electrode layer such as of graphite formed on a negative electrode collector, both the electrodes are disposed in a sealed vessel filled with an organic electrolyte solution to be spaced from each other by a separator.

Meanwhile, there are developed lithium secondary cells employing polymeric positive electrode layer materials such as polyanilines (hereinafter abbreviated sometimes as PAn), in place of $LiCoO_2$ used as the positive electrode layer material, for the purpose of weight reduction and for safety's sake. And also there are developed lithium secondary cells containing additionally in the positive electrode layer a thiol compound having a great theoretical capacity such as 2,5-dimercapto-1,3,4-thiadiazole (hereinafter abbreviated as DMcT), which increases storable energy density.

In positive electrode layer materials, thiol compounds each having a mercapto group (—SH) in the molecule such as DMcT undergo reversible formation and dissociation of the disulfide bonds (—SS—) as redox reactions take place, so that those compounds which have two —SH groups in the molecule like DMcT each liberate two electrons per molecule in the oxidation reaction to undergo a polymerization reaction and form a polydisulfide bond, whereas they each undergo a depolymerization in the reduction reaction to return to the DMcT monomer. Further, DMcT has insulating properties both in the form of oxidant and in the form of reductant. Accordingly, it is necessary to combine DMcT with a conductive material so that it can be used as an electrode material. Such conductive materials include carbon powders or fibers such as graphite powders, graphite fibers and acetylene black (hereinafter abbreviated sometimes as AB) powders, and conductive polymers such as polypyrroles excluding PAn.

OBJECT AND SUMMARY OF THE INVENTION

Since it is necessary to increase the redox reaction rate in such positive electrode layer materials for lithium polymer secondary cells, it has conventionally been attempted to improve charge and discharge characteristics of cells by combining the positive electrode layer materials with various types of collectors.

For example, in a polymer secondary cell, there is proposed a capability of use of a copper collector in combination with a DMcT-PAn composite. When a copper collector is used in such polymer secondary cells, the copper collector itself serves also as an electrode active material, and redox reactions of copper take place at the positive electrode during charging and discharging. Therefore, Cu ions are discharged from the copper constituting the positive electrode into the solid electrolyte during charging, whereas lithium ions are converted to metal lithium at the negative electrode to reduce the lithium ions in the solid electrolyte. Reversed reactions take place during discharging. Accordingly, with the timing that the solid electrolyte has run dry of lithium ions during charging, the cell becomes non-chargeable. That is, in a polymer secondary cell composed essentially of a copper collector and a DMcT-PAn composite, the number of lithium ions contained initially in the solid electrolyte limits chargeable capacity. Thus, in order to obtain a sufficient capacity per unit surface area, the film thickness of the solid electrolyte must be increased.

The present invention, which was accomplished in view of the problems as described above, is directed to providing a lithium secondary cell in which the film thickness of the solid electrolyte can be reduced.

The lithium secondary cell according to the present invention comprises a composite electrode, as a positive electrode, having a positive electrode layer containing a mercaptide compound, in which the hydrogen atom in at least one mercapto group is substituted with a lithium atom, and a conductive material carried on a collector; a polyelectrolyte; and a lithium negative electrode.

The lithium secondary cell of the present invention is characterized in that the mercaptide compound is lithium thiocyanurate.

The lithium secondary cell of the present invention is characterized in that the conductive material contains a polyaniline.

The lithium secondary cell of the present invention is characterized in that the collector is a carbon film.

The lithium secondary cell of the present invention is characterized in that the polyelectrolyte contains at least one of ethylene carbonate and propylene carbonate.

DESCRIPTION OF THE PREFERRED EMBODIMENTS

Figure 1:
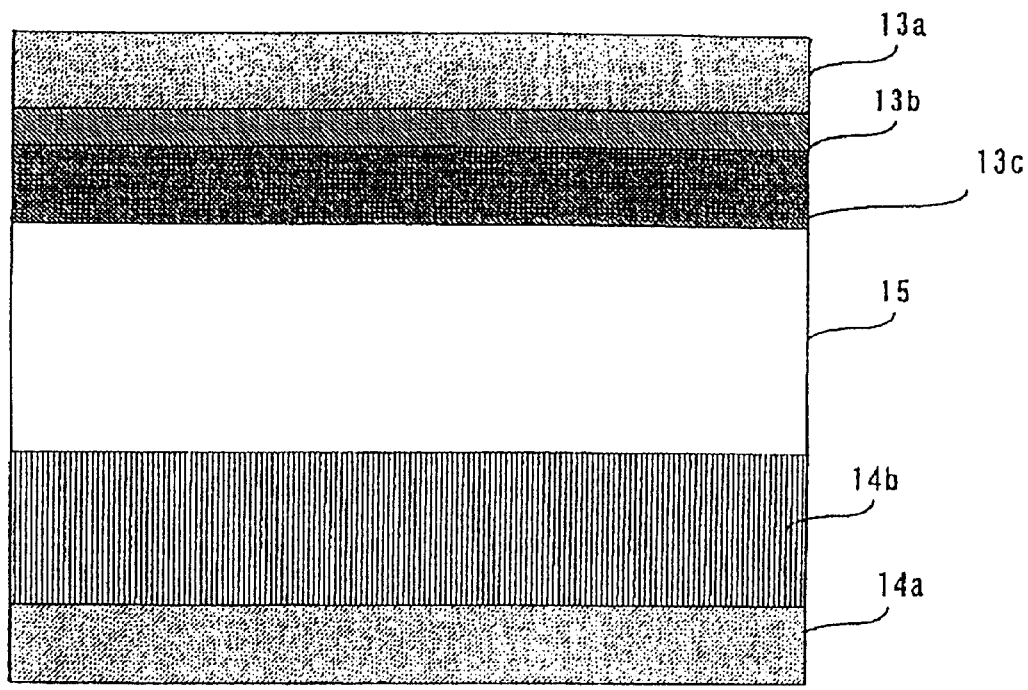
FIG. 1 is a schematic partial cross-sectional view of the secondary cell according to one example of the present invention.

The present invention will be described below specifically by way of examples referring to the drawings.

The present inventors came to a conclusion that, in order to realize reduction of the film thickness in the solid electrolyte of a lithium secondary cell having a thiol compound incorporated into the positive electrode layer, there should be caused such a reaction to take place as Li ions be supplied from the positive electrode into the solid electrolyte during charging. The thiol compound assumes the form of polymer during charging, since the mercapto group —SH of the thiol compound reacts with an —SH group of another molecule of the thiol compound, whereas the thiol compound is depolymerized during discharging to assume the form of monomer. The present inventors contrived to substitute the H atom in the mercapto group —SH beforehand chemosynthetically or electrochemically with a Li atom to form a lithium salt of the thiol compound and to use this lithium salt as the positive electrode, whereby enabling supplementation of Li ions into the solid electrolyte. The present inventors fabricated a lithium secondary cell by combining a composite positive electrode having a positive electrode layer containing a thiol compound such as lithium thiocyanurate (hereinafter abbreviated as TTCA); a metal lithium negative electrode; and a polyelectrolyte to evaluate charge and discharge characteristics. The lithium TTCA-PAn positive electrode layer was prepared by means of glass bar coating using an N-methyl-2-pyrrolidone (hereinafter abbreviated as NMP) solution containing lithium TTCA and PAn. In the polyelectrolyte of this cell, there is employed preferably a non-aqueous solvent such as ethylene carbonate (hereinafter abbreviated as EC) and propylene carbonate (hereinafter abbreviated as PC), and further γ-butyrolactone, 1,2-dimethoxyethane, dimethyl carbonate, diethyl carbonate, diethyl ether or tetrahydrofuran can also be employed.

As an electrolyte salt of the polyelectrolyte in the lithium cell, a lithium salt such as $LiBF_4$ is used, and $LiClO_4$, $LiPF_6$, $LiAsF_6$ or $LiCF_3SO_3$ can also be used.

A positive electrode charge capacity of 239 mAh/g was observed in the thus fabricated secondary cell. The value of discharge capacity observed was about 75% of the theoretical value, and thus it was found that Li ions are utilized in the lithium TTCA-PAn positive electrode layer during charging.

As shown in FIG. 1, the lithium secondary cell according to the present invention has a structure which comprises; a positive electrode 13 having a positive electrode layer 13c containing a mercaptide compound, in which the hydrogen atom in the mercapto group is substituted with a lithium atom such as lithium TTCA, formed on a carbon film collector 13b present on a positive electrode collector 13a such as of titanium; and a negative electrode 14 having a lithium negative electrode layer 14b formed on a negative electrode collector 14a such as of titanium are disposed to be spaced from each other by a solid electrolyte 15 containing a mixed organic electrolyte of EC and PC and a lithium salt such as $LiBF_4$.

The mercaptide compound employable according to the present invention includes at least one of the compounds represented by the following formulae 2 to 26, in addition to the lithium TTCA represented by the following formula 1.

(1)

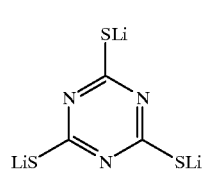

(2)

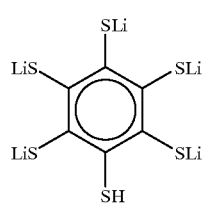

(3)

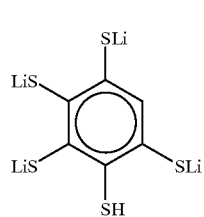

-continued (4)

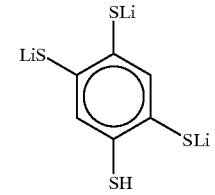

(5)

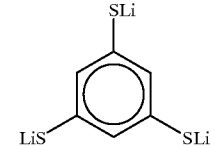

(6)

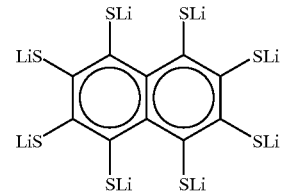

(7)

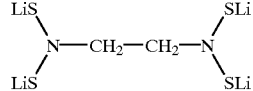

(8)

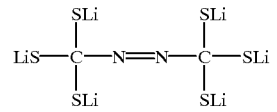

(9)

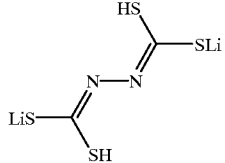

(10)

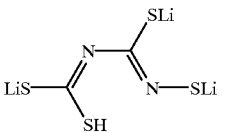

(11)

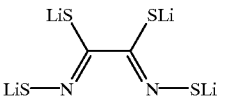

(12)

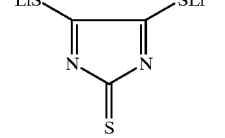

(13)

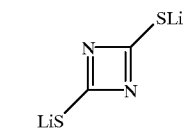

-continued

(14) 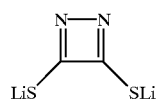

(15) 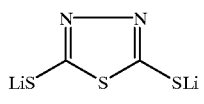

(16) 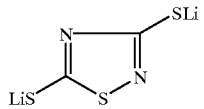

(17) 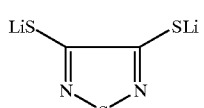

(18) 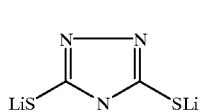

(19) 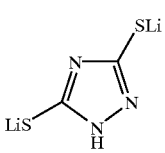

(20) 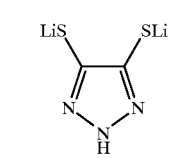

(21) 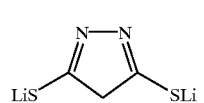

(22) 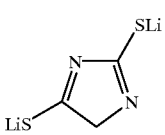

(23) 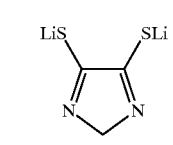

(24) 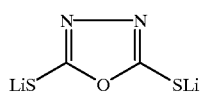

(25) 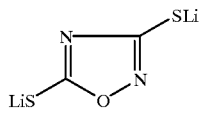

-continued

(26) 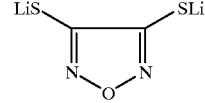

While the hydrogen atoms of all the mercapto groups are substituted with lithium atoms in the above mercaptide compounds, the mercaptide compound is not to be limited to the listed. There can be used the other mercaptide compounds in each of which the hydrogen atom of at least one mercapto group in the listed mercaptide compound is substituted with a lithium atom.

The thickness of the carbon film employed here is preferably 0.1 μm to 100 μm. The mixing ratio in part by weight of (lithium TTCA) to (PAn) is preferably (2.2) (0 to 1). Further, PPy or AB can be added to lithium TTCA. As PAn, those obtained by subjecting aniline or its derivative to chemical polymerization or electrolytic polymerization can be employed.

In addition to that a carbon film is used as the collector employed in the manufacturing process of the present invention, there may be employed a porous carbon film made of carbon black and a fluoroplastic with titanium, a metal foil such as of aluminum and stainless steel, a conductive polymer film such as of PAn and PPy or a metal foil coated or covered with a conductive polymer film.

The polyelectrolyte of the present invention includes preferably those assuming the solid or semi-solid form, which does not permit easy diffusion and migration of organic disulfide monomers. There are effectively used solid polyeletrolytes formed by dissolving lithium salts such as $LiClO_4$, $LiCF_3SO_3$ and $LiN(CF_3SO_2)_2$ respectively in polyethylene oxide, and semi-solid polyelectrolytes formed by gelling, using a polymer such as polyacrylonitrile, polyvinylidene fluoride and polyacrylic acid, electrolyte solutions prepared by dissolving lithium salts such as $LiClO_4$, $LiCF_3SO_3$, $LiBF_4$, $LiPF_6$ and $LiN(CF_3SO_2)_2$ respectively in nonaqueous solvents such as propylene carbonate and ethylene carbonate. An electrolyte solution prepared by dissolving a lithium salt in NMP may also be added.

EXAMPLES

A lithium ion secondary cell having a positive electrode layer containing lithium TTCA, PAn, PPy and AB was evaluated for its discharge capacity.

In 16 g of NMP was dissolved 4.4 g of lithium TTCA powder, and the resulting solution was mixed with 16 g of a solution of PAn (12.5%)/NMP to prepare a lithium TTCA-PAn-NMP solution. This solution was applied on a 80 μm-thick carbon film formed on a 30 μm-thick titanium foil collector base material by means of glass bar coating (using a 150 μm-thick spacer) and then baked at 80° C. for 15 minutes under argon gas purging, followed by vacuum drying at 80° C. for one hour to obtain a positive electrode layer film containing lithium TTCA and PAn at a weight ratio of lithium TTCA:PAn=2.2:1. A positive electrode having a diameter of 16 mm was punched out from this film.

Next, a 16 mm-diameter piece was punched out from a 0.2 mm-thick lithium foil and was laminated on a 30 μm-thick titanium foil collector base material to provide a negative electrode.

Subsequently, an electrolyte solution was prepared by dissolving $LiBF_4$ in a mixed solvent of EC:PC=40:60 (vol %) at a rate of 1.65 M/liter. This electrolyte solution was mixed with a polyacrylonitrile:methyl acrylate=9:1 (molar ratio) polymer at a weight ratio of the electrolyte solution/polymer=8.28 to form a solution, and the solution was gelled by left as it was at −20° C. for 5 hours to give a solid electrolyte having a film thickness of 0.8 mm.

Finally, the solid electrolyte obtained as a separator layer was loaded on the thus obtained positive electrode contained in the vessel, and then the thus obtained negative electrode was loaded further on the separator layer to give a lithium secondary cell.

A lithium secondary cell was fabricated as a comparative example in the same manner as in the above example except that the ratio of the components of the positive electrode layer was TTCA:PAn:PPy=2:1:0.5 (in terms of weight ratio).

Figure 2:
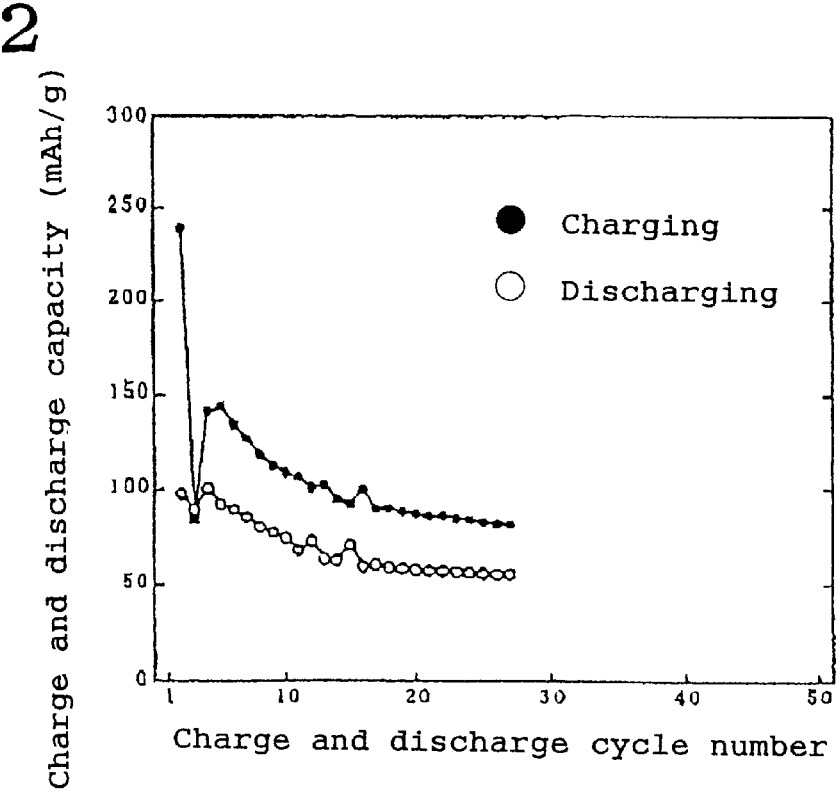
FIG. 2 is a graph showing charge and discharge capacities vs. charge and discharge cycle numbers.

Charge and discharge capacities of these lithium secondary cells were determined under the same charge and discharge conditions while they were maintained at room temperature. Further, these cells were subjected to charge and discharge cycles to determine discharge capacities in each charge and discharge cycle so as to count the cycle numbers at the time point where the discharge capacity dropped to 80% of the initial value. The results are summarized in FIG. 2. The following table shows some of the cases which gave good results.

TABLE

|  | Film composition (weight ratio) | Charge capacity (mAh/g) | Discharge capacity (mAh/g) | (mAh/cm$^2$) | Cycle characteristics (80% of max) |
|---|---|---|---|---|---|
| Example | Li TTCA:PAn = 2.2:1 | 239 | 100 | 0.3 | 7 cycles |
| Comp. Example | TTCA:PAn:PPy = 2:1:0.5 | 246 | 74 | 0.1 | 3 cycles |

As seen from the above results, it is understood that the lithium secondary cell of the example of the present invention exhibits a charge capacity of 239 mAh/g and a discharge capacity of 100 mAh/g, and the example also shows a great cycle number and small drop in the capacity from the value in charge to the value in discharge, in a charge and discharge cycle, compared with the comparative example.

The charge and discharge reaction mechanisms of the cell employing lithium TTCA as the positive electrode are as follows. The Li ions are released from the positive electrode lithium TTCA into the solid electrolyte during charging to make up for the loss in the solid electrolyte, whereas Li ions are converted to metal lithium at the negative electrode to cause reduction of Li ions. Meanwhile, reversed reactions take place at the positive electrode and negative electrode respectively during discharging, so that the Li ion concentration in the solid electrolyte does not change and that the solid electrolyte is surmised to act as a medium for transporting Li ions. According to the charge and discharge reaction mechanisms, if lithium TTCA obtained by substituting the H atom of the mercapto group (—SH) of TTCA with a Li atom is employed as the positive electrode, there occurs such a reaction that Li ions are released from the positive electrode into the solid electrolyte during charging to supply Li ions to the solid electrolyte as demonstrated in the example, so that the thickness of the solid electrolyte can be reduced to the order of several tens of $\mu$m.

As described above, according to the present invention, since the lithium secondary cell essentially consists of a composite electrode, as a positive electrode, having a positive electrode layer, containing lithium thiocyanurate and a conductive material, carried on a carbon film; a polyelectrolyte separator; and a lithium negative electrode, the resulting cell has a high energy density with little drop in the discharge capacity during charging and discharging.

What is claimed is:

1. A lithium secondary cell comprising:

a composite electrode as a positive electrode having a positive electrode layer, containing a mercaptide compound and a conductive material, carried on a collector; the hydrogen atom of at least one mercapto group in the mercaptide compound being substituted with a lithium atom;

a polyelectrolyte; and a lithium negative electrode.

2. The lithium secondary cell according to claim 1, wherein the mercaptide compound is lithium thiocyanurate.

3. The lithium secondary cell according to claim 1, wherein the conductive material contains a polyaniline.

4. The lithium secondary cell according to claim 1, wherein the collector is a carbon film.

5. The lithium secondary cell according to any of claim 1, wherein the polyelectrolyte contains at least one of ethylene carbonate and propylene carbonate.

* * * * *